United States Patent [19]
Davis

[11] Patent Number: 5,846,504
[45] Date of Patent: Dec. 8, 1998

[54] EMISSION CONTROL DEVICE FOR PREVENTING ORGANIC COMPOUNDS EMISSIONS

[76] Inventor: Robert Ora Davis, 212 Cove Dr., Coppell, Tex. 75019

[21] Appl. No.: 715,845

[22] Filed: Sep. 25, 1996

[51] Int. Cl.$^6$ .................................................. C01B 31/36
[52] U.S. Cl. ..................................... 423/245.3; 423/245.1; 422/168; 422/180; 502/339
[58] Field of Search ..................... 422/168, 169, 422/170, 173, 174, 176, 177, 180, 222; 423/212, 213.2, 213.5, 245.1, 245.3; 502/313, 325, 326, 339

[56] References Cited

U.S. PATENT DOCUMENTS

| | | | |
|---|---|---|---|
| 4,239,656 | 12/1980 | Fujitani et al. | 252/462 |
| 4,299,734 | 11/1981 | Fujitani et al. | 252/462 |
| 5,075,274 | 12/1991 | Kiyohide et al. | 502/303 |
| 5,229,079 | 7/1993 | Harada et al. | 422/174 |
| 5,538,697 | 7/1996 | Abe et al. | 422/171 |

OTHER PUBLICATIONS

Factory Mutual Research Report, Catalytic Heaters (Natural Gas and LP–Gas) Model Nos. R–8, R–12, B6–6, B6–24, B10–12, B12–12, B12–24, B12–36, B12–48, B12–69, B18–36, B18–48, B18–60, and B24–69 For Use In Class I, Division 2, Group D Hazardous Locations and Ordinary Locations from Bruest Industries, Inc., P.O. Box 827, 20th & Sycamore, Independence, Kansas 67301. 1985.
Bruest Sales, Inc., Sales Literature, "Infra–Red Radiant Heaters", 1985.
Bruest Sales, Inc., Sales Literature, "Catalytic Combustion Process", 1985.

*Primary Examiner*—Jeffrey Stucker
*Attorney, Agent, or Firm*—F. Lindsey Scott

[57] ABSTRACT

An apparatus for preventing the emission of organic compounds including: a first tubular member including a first sintered metal wall section having its first end closed; a gas inlet for an organic compounds containing gaseous stream into an inside of the first tubular member; a catalyst comprising a catalytic compound carried by a porous substrate and positioned around the first sintered metal wall section; and a second tubular member having its first end closed, including a second sintered metal wall section and sealingly positioned to enclose the first tubular member and the catalyst. The apparatus may also include a third tubular member positioned inside the first tubular member and having its first end closed; a plug positioned to close an annular passageway between the first tubular member and third tubular member downstream from the gas inlet; and a heater optionally positioned in the third tubular member. The present invention further comprises a method for preventing the emission of organic compounds contained in a gaseous by emitting the gaseous mixture through the apparatus.

18 Claims, 3 Drawing Sheets

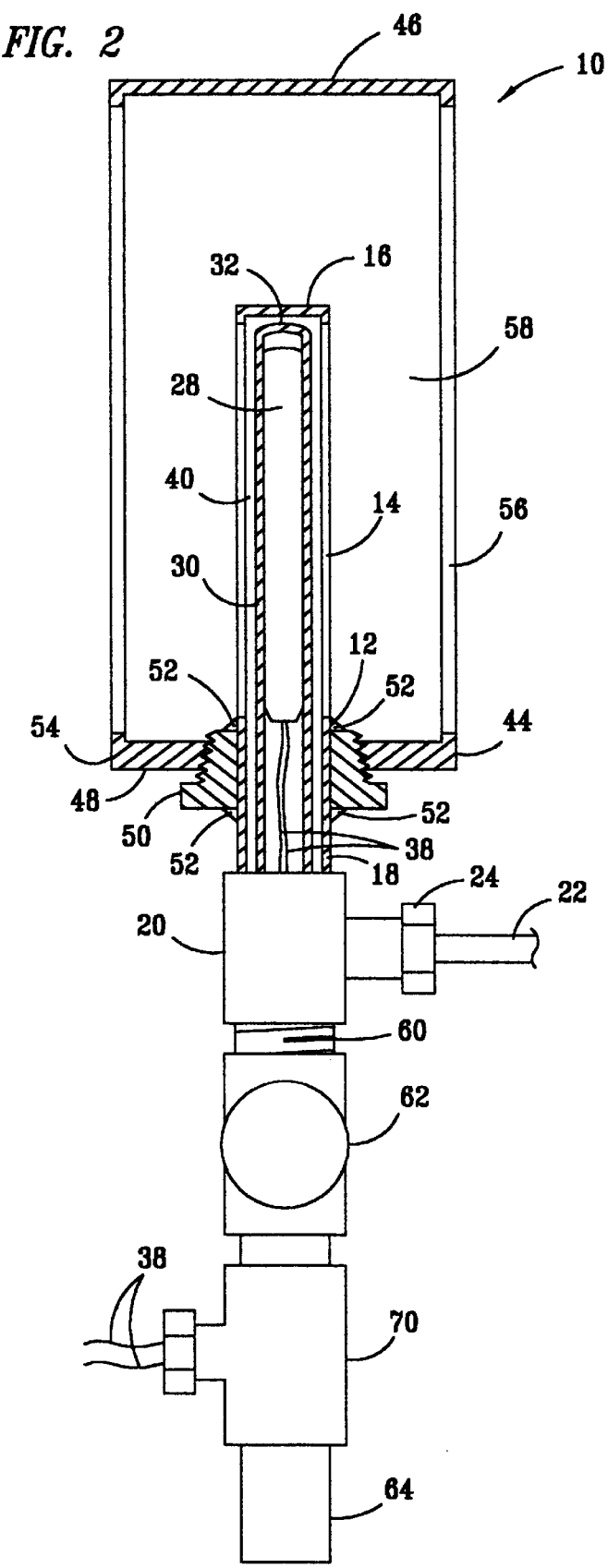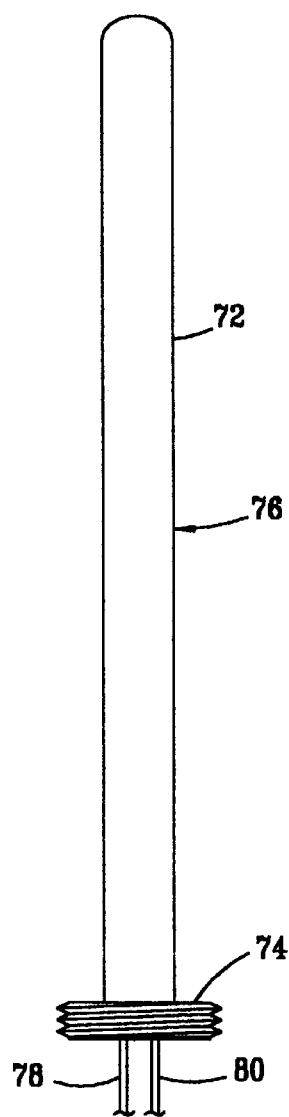

EMISSION CONTROL DEVICE FOR PREVENTING ORGANIC COMPOUNDS EMISSIONS

BACKGROUND OF THE INVENTION

1. Field of the Invention

The present invention relates to a method and a device for preventing the escape of organic compounds contained in gaseous streams such as those emitted from analytical and process control equipment and the like into the atmosphere.

2. Description of Related Art

In recent years there has been increasing concern about the emission of organic compounds and other contaminants into the atmosphere. As a result regulations governing permissible emissions into the atmosphere have been promulgated and the emission of organic compounds is generally prohibited.

Concurrently with the increased concern about organic compounds emissions more stringent requirements for refined fuels and other refinery products have been promulgated. As a result increased process control is necessary and increased numbers of on-line chemical analyzers and process control instruments have been installed. Similar analyzers are also used in laboratories and other locations for similar analyses. Similar streams may be released from vented vessels and the like and may contain other materials in addition to the organic compounds.

Such analytical equipment may comprise chromatographs, moisture analyzers, hydrogen sulfide analyzers, sulfur analyzers and the like and typically operates by passing a gaseous stream containing organic compounds materials along with a carrier gas which may be an inert carrier gas- and the like through the instrument to make the required analysis. Generally, these instruments are sensitive to pressure variations at the instrument discharge i.e. the back pressure on the instrument. The pressure normally used as the reference pressure is atmospheric pressure since it is relatively constant and is readily measured. As a result there has been a tendency to discharge such streams into the atmosphere. While such streams are small for each individual instrument, cumulatively they can result in a substantial amount of organic compounds discharge to the atmosphere. Further, such streams may in fact comprise combustible mixtures and may constitute a fire or explosion hazard. Since these emissions occur in relatively small quantities for each instrument. It has been difficult to develop a system to collect and process these emissions to remove organic compounds prior to discharging the gases to the atmosphere. Efforts to collect these gases are inhibited by the fact that the pressure at which the gases are discharged is desirably relative constant during the instrument's operation. As noted previously, such instruments typically use atmospheric pressure since it is relatively predictable and readily measured.

Various methods such as flares holding vessels and the like have been used to treat or contain larger streams containing organic compounds in various concentrations and in liquid or gaseous form. Most such larger systems are subject to wide and relatively unpredictable pressure variations especially when coupled directly to operating units.

Accordingly a continuing search has been directed to the development of an economical and effective method and equipment to effectively oxidize organic compounds contained in organic compounds-containing streams prior to discharging the streams to the atmosphere without creating a variable back pressure during the treatment.

SUMMARY OF INVENTION

An apparatus comprising: a first tubular member including a first sintered metal wall section having its first and second ends closed; a gas inlet for a organic compounds-containing gaseous stream in fluid communication with an inside of the first tubular member; a catalyst comprising a catalytic compound carried by a porous substrate and positioned around the first sintered metal wall section; and a second tubular member having its first end closed, including a second sintered metal wall section and sealingly positioned to enclose the first tubular member and the catalyst.

The apparatus may also include a third tubular member positioned inside the first tubular member, having its first end closed and forming an annular passageway between the inside of the first tubular member and the outside of the third tubular member; a plug positioned to close the annular passageway downstream from the gas inlet; and a heater operatively positioned in the third tubular member near the first end of the third tubular member.

The first sintered metal wall section may include a catalytic compound.

The present invention further provides an emission control device comprising: a first tubular member including a catalyst impregnated first sintered metal wall section and having its first end closed; a gas inlet positioned in fluid communication with an inside of the first tubular member; a second tubular member having its first end closed, including a second sintered metal wall section and sealingly positioned to enclose the first tubular member and form an annular passageway between an inside of the second sintered metal wall section and an outside of the first sintered metal wall section.

The present invention further comprises a method for preventing the emission of organic compounds-containing gaseous streams by passing the gaseous stream through a first sintered metal section; a catalyst and a second sintered metal section to the atmosphere.

BRIEF DESCRIPTION OF THE DRAWINGS

The apparatus of the invention is further described and explained in relation to the following figures wherein:

FIG. 2 is a partial schematic diagram of an alternate embodiment of the present invention;

FIG. 3 shows an alternate embodiment of the heater and in a tubular member.

DESCRIPTION OF THE PREFERRED EMBODIMENTS

In the discussion of the Figures the same numbers are used to refer to the same or similar components throughout.

Figure 1:
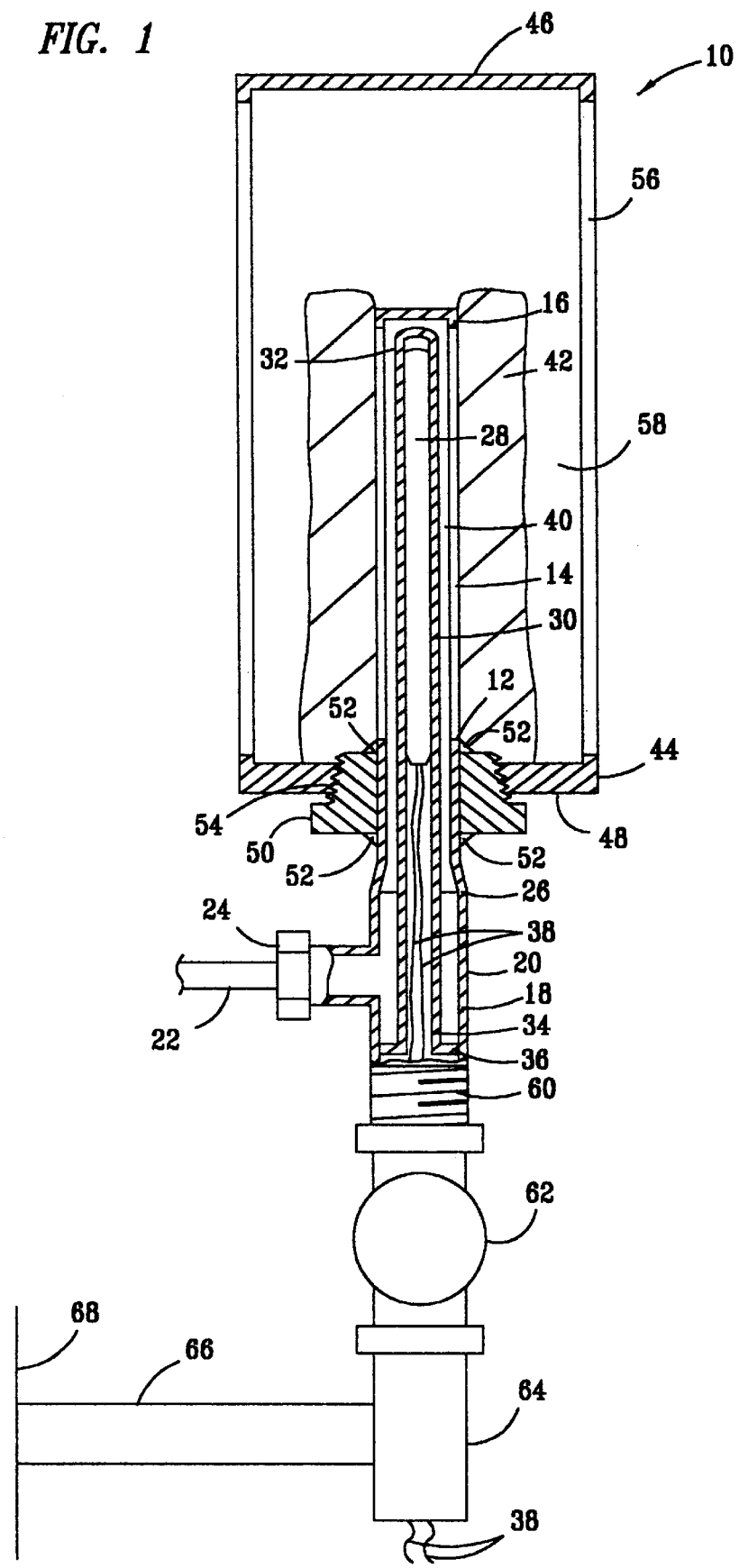
FIG. 1 is a partially schematic diagram of an embodiment of the present invention.

In FIG. 1 an emission control device 10 is shown. Emission control device 10 comprises a tubular member 12 which includes a first closed end 16 and a second closed end 18 with a sintered metal section 14 being positioned near first end 16. Sintered metal section 14 is of a length and diameter to provide for the passage of a selected volume of gases at a relatively low pressure drop. A Tee 20, including a gas inlet 22, joined to Tee 20 by fitting 24 is shown formed as a lower portion of tubular member 12.

A heater 28 is positioned inside a tubular member 30 which is positioned inside tubular member 12. Tubular member 30 includes a first closed end 32 and a second end 34. Heater 28 is desirably positioned in tubular member 30 generally inside sintered metal section 14. Wires 38 provide electrical power to heater 28.

Tubular member 30 is sealingly joined to first tubular member 12 as shown by a plug 36. An annular space 40 is formed between the outside of tubular member 30 and the inside of tubular member 12.

A tubular member 44 is shown sealingly positioned over sintered metal section 14. Tubular member 44 includes a top 46 and a bottom 48 and is sealingly joined by a fitting 50 to tubular member 12. Fitting 50 is sealingly joined to tubular member 12 by a plurality of welds 52 and to tubular member 44 by threads 54. Tubular member 44 includes a second sintered metal section 56.

A catalyst member 42 is positioned around first sintered metal section 14 in close communication with the outside of sintered metal section 14. Suitable catalysts include materials such as quartz wool, and other inorganic material or inorganic material oxide wool or fibrous materials which are impregnated with a suitable catalytic compound such as platinum compounds, palladium compounds, noble metal compounds or the like. Substantially any catalytic material which is effective to facilitate the oxidation of organic compounds at an elevated temperature below the flame ignition temperature in the presence of oxygen is suitable. First sintered metal section 14 may also be catalyst impregnated. Some applications of such catalytic materials are disclosed in "Infra-red Radiant Heaters," published by Bruest Sales. Inc. prior to Sep. 20, 1996. Solid or rigid substrates may also be used provided the catalyst is placed in close engagement with sintered metal section 14 so that gases flowing through sintered metal section 14 cannot bypass the catalyst.

An annular space 58 is positioned between an outside diameter of catalyst 42 and the inner diameter of tubular member 44. A pipe 60 extends from second end 18 of tubular member 12 and contains wires 38 which extend to an explosion proof housing 62 such as the explosion proof, dust-ignition-proof conduit outlet boxes marketed by Appleton Electric Company, 1701 W. Wellington Avenue, Chicago, Ill. 60657. A pipe 64 extends beneath explosion proof housing and may constitute any suitable type of explosion proof housing for wires 38.

Pipe 64 also includes a support 66 for mounting emission control device 10 to a wall 68 or the like.

In FIG. 2 an alternate embodiment is shown wherein sintered metal section 14 is impregnated with a suitable catalyst by soaking, spraying or any other effective technique and functions as the catalyst substrate so that the catalytic reaction occurs in sintered metal section 14 and wherein no catalyst 42 is used. A catalyst-impregnated sintered metal section 14 may be used alone or in combination with catalyst 42. For instance, in FIG. 1 sintered metal section 14 may be catalyst impregnated. In FIG. 2 emission control device 10 is configured to be mounted using pipe 64 as a vertical support. Wires 38 extend from a Tee 70 as shown.

In FIG. 3 an alternate embodiment of the heater is shown as a heater 72. Heater 72 is formed to extend into tubular member 12 to the position occupied by tubular member 30 in FIG. 1 and is sealingly positioned in tubular member 12 by a fitting 74 positioned beneath gas inlet 22. Desirably heater 72 is designed to heat in the portion above an arrow 76 which is the zone inside sintered metal section 14. Heater 72 could heat along its entire length but it is preferable that it heat only in the upper portion as described. Heater 72 comprises a combination of second tubular member 30 and heater 28 as shown in FIG. 1 and may be heated electrically as shown in FIG. 1 or by steam as shown in FIG. 3 by a steam inlet 78 and a condensate outlet 80.

In the practice of the present invention a gaseous stream containing organic compounds is introduced into the device of FIG. 1 through line 22 and passes upwardly through annular space 40 wherein the gas is heated and thereafter passes through sintered metal section 14 into contact with catalyst 42. In catalyst 42 the organic compounds containing gas comes in contact with oxygen which diffuses into catalyst 42 through sintered metal section 56. The catalyst is desirably heated to a temperature of at least about 107° C. prior to passing the gas into catalyst 42. In catalyst 42, the organic compounds contained in the gaseous stream are oxidized at a temperature below the flame ignition temperature to produce carbon dioxide and water and the temperature of the gas increases depending upon the amount of organic compounds contained in the gaseous stream. The reaction product stream containing carbon dioxide and water then passes out of catalyst 42 and into annular space 58 and diffuses out of emission control device 10 through sintered metal section 56. It will be noted that by use of plug 36, gases from inlet 22 cannot pass downstream beyond second end 34 of tubular member 30 and are directed upstream as discussed above. Tubular member 12 can be considered to extend to the bottom of Tee 20 since tubular member 12 in FIG. 1 is formed as a part of Tee 20. A variety of plumbing arrangements and component parts can be used to assemble the component parts of the present invention. For instance, the device could be assembled using welded connections or other component parts than shown in FIG. 1 or the like.

The use of a heater may not be necessary in instances where the organic compounds in the gaseous stream are sufficiently reactive or are already at a temperature sufficient to initiate the oxidation reaction in catalyst 42 or catalyst impregnated sintered metal section 14. It is preferred that a heater be used and left on at all times when a gaseous stream may be charged to the device.

In the operation of the device shown in FIG. 1 the possibility of explosions is minimized. The wires required to provide power to heater 28 are contained in a sealed conduit 60 to an explosion proof housing 62 from which they are passed through a further conduit 64, which is desirably an explosion proof conduit to a power source (not shown).

Heater 28 is contained in tubular member 30 to eliminate any contact of a organic compounds-containing gas with wires 38 which could potentially provide a spark. The walls of tubular member 30 are of a high-strength, corrosion-resistant alloy and at least about 0.0625 inch and preferably at least about 0.125 inch in thickness which is considered to be sufficient thickness to contain any potential explosion in annular space 40 between tubular member 30 and tubular member 12. The gaseous mixture flowing outwardly through sintered metal section 14 into annular space 58 is an oxidizable mixture which is contacted with oxygen in catalyst 42 or a catalyst in sintered metal section 14. Any explosion in annular space 58 is contained between first tubular member 12 and tubular member 44. Both these members are desirably constructed of a high-strength, corrosion-resistant alloy and are at least 0.0625 inch in thickness which is considered to be sufficient thickness to contain any potential explosion.

It is believed that this device will be suitable for use in Class One, Division One applications under the National Electrical Code (Article 50).

Sintered metal section 14 and sintered metal section 56 desirably contain pores having a diameter from about 20 to about 50 microns and preferably from about 35 to about 45 and even more preferably about 40 microns in diameter. Pores of this size are considered suitable for use at flow rates of up to one liter per minute. In the event that higher flows are desired the length and/or the diameter of the tubular members may be increased.

Desirably tubular member 12, tubular member 30 and tubular member 44 including the sintered wall sections are fabricated of a high strength, corrosion resistant metal alloy having good corrosion resistance and sufficient strength to contain potential explosions in the annular spaces. Stainless steel alloys such as monel, inconel, hastelloy and the like are suitable and the walls of the tubular members are suitably at least about 0.0625 inch thick and preferably at least about 0.125 thick. The use of sintered stainless steel isolates the hot catalyst from the atmosphere and protects the catalyst against the elements in outdoor installations. The sintered metal alloy has sufficient strength to contain any potential explosion and is sufficiently conductive to cool escaping gases. Thus the sintered metal alloy provides both high permeability and high flame arresting properties.

Heater 28 is normally left on at all times so that intermittent flows through emission control device 10 at any time are suitably oxidized before discharge to the atmosphere. This is necessary with automatic on-line equipment since the analysis performed may be performed periodically and even if emission control device 10 is used in connection with a laboratory and the like, warm up periods and the like are desirably avoided.

The catalyst is selected as known to those skilled in the art to optimize oxidation of the anticipated organic compounds and may be any suitable catalyst for facilitating the oxidation of organic compounds to carbon dioxide and water. It is particularly preferred that the catalyst be selected from the group consisting of platinum compounds and palladium and other noble metal compounds. The substrate may be any suitable refractory or ceramic material which contains sufficient porosity to provide the desired low pressure drop through the catalyst and sufficient density to ensure intimate contact of the gaseous mixture with the catalytic components. Such materials may include quartz wool, fiberglass, polycrystalline alumina, vitreous aluminosilicate, alumina and the like as known to the art as the substrate. The catalytic compound may be sprayed onto the substrate especially if a fibrous substrate is used or otherwise impregnated in or carried by the substrate as known to those skilled in the art in a quantity sufficient to achieve the desired reactivity. When more rigid substrates are used the catalytic compounds may be included in or on the substrates as known to the art. When the catalyst is positioned around sintered metal section 14 it is required that the catalyst closely engage the outer diameter of sintered metal section 14 so that organic compounds-containing gases cannot bypass the catalyst. An advantage of the present invention is that the gaseous mixture passed through the device, flows through the device with a minimal pressure drop.

Figure 4:
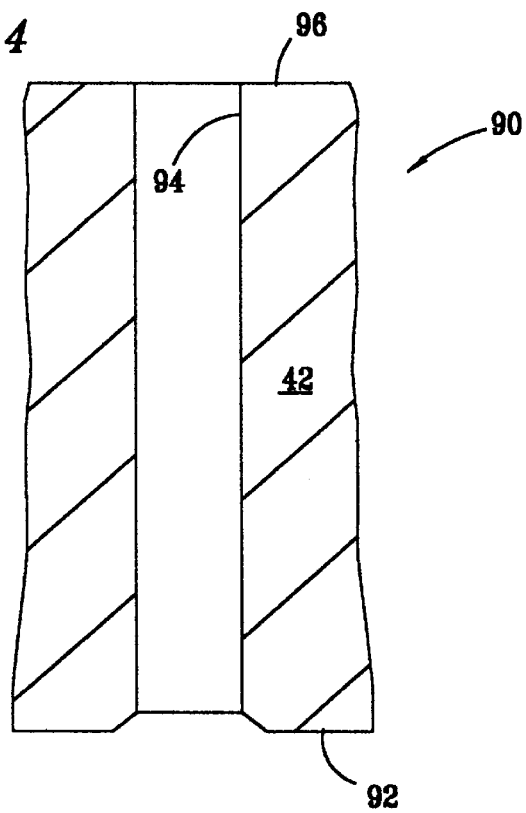
FIG. 4 shows a catalyst cartridge useful in the device of the present invention.

In FIG. 4 a catalyst cartridge 90 comprising the catalyst 42 is shown. Cartridge 90 is a generally cylindrical catalyst cartridge configured to closely contact the outside of first tubular means 12 over sintered metal section 14 at an inner diameter 94 of cartridge 90. A bottom 92 of cartridge 90 is configured to closely contact the surfaces of the device 10 at fitting 50 to insure that no gases passing through sintered metal wall section 14 can by-pass catalyst 42. A top 96 of cartridge 90 extends above the top of sintered metal section 14 so that no gases passing through sintered metal section 14 can by-pass catalyst 42.

Figure 5:
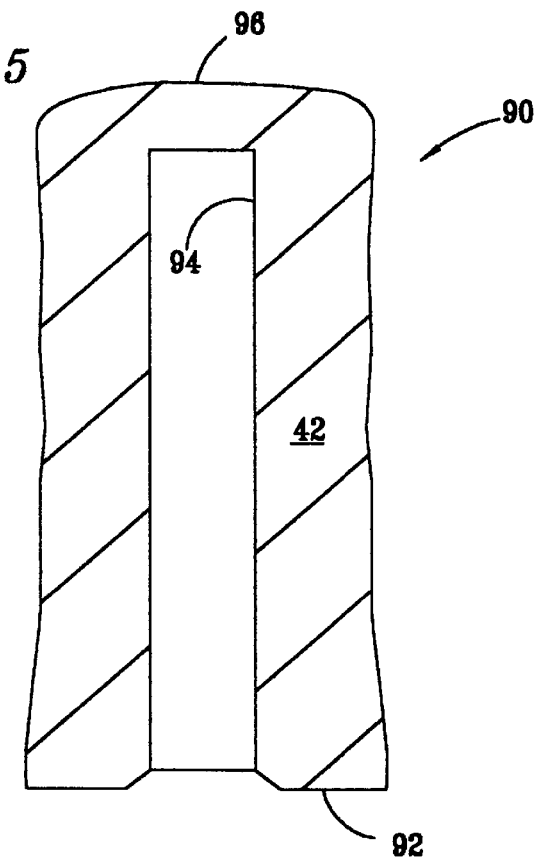
FIG. 5 shows a further embodiment of a catalyst cartridge useful in the device of the present invention.

In FIG. 5 a similar cartridge is shown. The cartridge in FIG. 5 includes a closed top 96. Otherwise the cartridge in FIG. 5 functions in the same way as the cartridge in FIG. 4.

The pressure drop through the device is constant at comparable flow rates so that a constant back pressure is provided on the analytical or process control instrument. This is a requirement of many such instruments and is the reason for the frequent discharge of emissions from these instruments to the atmosphere. Similarly the emission devices of the present invention readily accommodate relatively small volume organic compounds-containing gas flows economically. The device can be located in environments which are generally considered to be hazardous environments where streams from on-line analytical and process control equipment are frequently located.

By the method of the present invention gases are passed into device 10 through line 22, optionally heated, passed outwardly through a sintered metal wall section 14 containing a catalyst or into and through catalyst 42 wherein the organic compounds are oxidized to carbon dioxide and water and then outwardly through sintered metal section 56 to the atmosphere. Desirably, emission control device 10 is mounted in an area where it is unlikely to be touched inadvertently since the exterior temperature of tubular member 44 may be as high as 100° C. Alternatively a cover screen or the like may be placed around the device so long as air flow to the device is not restricted.

The pore size in sintered metal sections 14 and 56 is desirably from about 20 to about 50 microns. Smaller pore diameters tend to result in an unacceptably large pressure drop whereas larger pore diameters do not sufficiently constrain potential explosions in annular space 58.

The pore size in sintered metal sections 14 and 56 is desirably from about 20 to about 50 microns. Smaller pore diameters tend to result in an unacceptably large pressure drop whereas larger pore diameters do not sufficiently constrain potential explosions in annular space 58.

While not shown in the Figures an oxygen-containing gas may be injected into the hydrocarbon-containing gas admitted through line 22 or into the third tubular member 44 through a line (not shown) including a flash or explosion arrester if desired.

While generally round tubular components are preferred and have been shown, it should be understood that square, rectangular or other shapes of tubular components are also suitable and are included in the term "tubular".

Having thus described the present invention by reference to its preferred embodiments it is respectfully pointed out that the embodiments described are illustrative rather than limiting in nature and that many variations and modifications are possible within the scope of the present invention. Many such modifications and variations may be considered obvious and desirable to those skilled in the art based upon a review of the foregoing description of preferred embodiments.

Having thus described the invention I claim:

1. An emission control device for preventing the emission of organic compounds-containing gaseous streams into the atmosphere and containing explosions and arresting flames resulting from oxidation of the organic compounds, the device comprising:

a) a first tubular member including a first sintered metal wall section containing pores from about 20 to about 50 microns in diameter and having its first and its second ends closed;

b) a gas inlet for an organic compounds-containing gaseous stream positioned in fluid communication with an inside of the first tubular member;

c) a catalyst comprising a catalytic compound carried by a porous substrate and positioned around the first sintered metal wall section; and d) a second tubular member having its first end closed, including a second sintered metal wall section containing pores from about 20 to about 50 microns in diameter and having its second end sealingly joined to the first tubular member to enclose the sintered wall section of the first tubular member and the catalyst and form a first annular passageway between an inside of the second sintered metal wall section and an outside of the catalyst.

2. The device of claim 1 wherein the device includes:

e) a third tubular member positioned inside the first tubular member and forming a second annular passageway between the inside of the first tubular member and an outside of the third tubular member and having its first end closed;

f) a plug positioned to close the second annular passageway downstream from the gas inlet; and g) a heater operatively positioned in the third tubular member near the first end of the third tubular member and in the first sintered metal wall section.

3. The device of claim 1 wherein electrical power is supplied to the heater via wires which are enclosed in a tubular member sealingly connecting the second tubular member and an explosion proof housing.

4. The device of claim 1 wherein the first, second and third tubular members are fabricated of high strength, corrosion resistant metal alloy.

5. The device of claim 2 wherein the catalyst comprises a catalytic compound selected from the group consisting of platinum and palladium compounds.

6. The device of claim 1 wherein the walls of each of the first, second and third tubular members have a thickness equal to at least 0.0625 inch.

7. The device of claim 2 wherein the heater and the third tubular member are formed as a sealed unit with a lower end of the unit being sealingly positioned in the first tubular member below the gas inlet with power wires to the heater being enclosed in the unit above the lower end of the unit.

8. The device of claim 1 wherein the first sintered metal wall section is catalyst impregnated.

9. The device of claim 1 wherein the catalyst comprises a cartridge of catalytic material configured to closely contact and cover the first sintered metal wall section.

10. A method for preventing emissions of organic compounds in a gaseous mixture comprising the organic compounds and containing explosions and arresting flames resulting from oxidation of the organic compounds, the method comprising:

a) passing the gaseous mixture through an enclosed first sintered metal section containing pores from about 20 to about 50 microns in diameter;

b) passing the gaseous mixture through an enclosed catalyst comprising a catalytic compound carried on a porous substrate to oxidize the organic compounds and produce a reaction product stream containing carbon dioxide and water;

c) passing the reaction product stream to the atmosphere through a second sintered metal section enclosing the first sintered metal section and the catalyst, and containing pores from about 20 to about 50 microns in diameter to contain explosions and arrest flames inside the second sintered metal section; and d) heating the gaseous mixture prior to passing the gaseous mixture to the catalyst.

11. The method of claim 10 wherein the gaseous mixture is heated to a temperature of at least 107° C.

12. The method of claim 10 wherein the gaseous mixture is passed through pores from about 20 to about 50 microns in diameter in the first sintered metal section and in the second sintered metal section.

13. An emission control device for preventing the emission of organic compounds-containing gaseous streams into the atmosphere and containing explosions and arresting flames resulting from oxidation of the organic compounds, the device comprising:

a) a first tubular member including a catalyst impregnated first sintered metal wall section containing pores from about 20 to about 50 microns the first tubular member having its first and second ends closed;

b) a gas inlet for an organic compounds-containing gaseous stream positioned in fluid communication with an inside of the first tubular member;

c) a second tubular member having its first end closed, including a second sintered metal wall section containing pores from about 20 to about 50 microns in diameter and sealingly positioned to enclose the first tubular member and form a first annular passageway between an inside of the second sintered metal wall section and the first sintered metal wall section.

14. The device of claim 13 wherein the device includes:

e) a third tubular member positioned inside the first tubular member and forming a second annular passageway between the inside of the first tubular member and an outside of the third tubular member and having its first end closed;

f) a plug positioned to close the second annular passageway downstream from the gas inlet;

g) a heater operatively positioned in the third tubular member near the first end of the third tubular member and in the first sintered metal wall section.

15. The device of claim 14 wherein the catalyst comprises a cartridge of catalytic material configured to closely contact and cover the first sintered metal wall section.

16. A cartridge of catalytic material carried on a suitable porous substrate and formed as a cylindrical section sized to closely contact and cover a generally round sintered metal wall section.

17. The cartridge of claim 16 wherein one end of the cylindrical section is closed with the catalytic material.

18. The cartridge of claim 17 wherein the catalytic material is selected from the group consisting of platinum and palladium compounds.

* * * * *